United States Patent
Moganty et al.

(10) Patent No.: US 12,074,283 B2
(45) Date of Patent: Aug. 27, 2024

(54) BIFUNCTIONAL IONIC LIQUIDS FOR ELECTROLYTES

(71) Applicant: Sionic Energy, Inc., Rochester, NY (US)

(72) Inventors: Surya Moganty, Henrietta, NY (US); Rutvik Vaidya, Rochester, NY (US); John Sinicropi, Rochester, NY (US); Yue Wu, West Henrietta, NY (US); Gabriel Torres, Rochester, NY (US)

(73) Assignee: NOHMS Technologies, Inc., Rochester, NY (US)

(*) Notice: Subject to any disclaimer, the term of this patent is extended or adjusted under 35 U.S.C. 154(b) by 762 days.

(21) Appl. No.: 16/867,025

(22) Filed: May 5, 2020

(65) Prior Publication Data

US 2021/0351436 A1    Nov. 11, 2021

(51) Int. Cl.
*H01M 10/0565* (2010.01)
*C08F 26/06* (2006.01)
*H01M 10/0525* (2010.01)

(52) U.S. Cl.
CPC ......... *H01M 10/0565* (2013.01); *C08F 26/06* (2013.01); *H01M 10/0525* (2013.01); *H01M 2300/0082* (2013.01)

(58) Field of Classification Search
CPC ......... H01M 10/0565; H01M 10/0525; H01M 2300/0082; C08F 26/06; C09D 139/00; Y02E 60/10
USPC ....................................................... 429/303
See application file for complete search history.

(56) References Cited

U.S. PATENT DOCUMENTS

| | | |
|---|---|---|
| 3,940,405 A | 2/1976 | Serad |
| 6,750,352 B2 | 6/2004 | Ono et al. |
| 2004/0202912 A1* | 10/2004 | Nishiura ........... H01M 10/0565 429/337 |
| 2012/0082903 A1 | 4/2012 | Zhang et al. |
| 2012/0231346 A1 | 9/2012 | Tsujii et al. |
| 2015/0010849 A1 | 1/2015 | Elabd et al. |
| 2016/0164137 A1 | 6/2016 | Moganty et al. |
| 2017/0288269 A1 | 10/2017 | Moganty et al. |
| 2017/0317352 A1 | 11/2017 | Lee et al. |

FOREIGN PATENT DOCUMENTS

| | | |
|---|---|---|
| CN | 109608592 | 4/2019 |
| JP | 2001-199961 A | 7/2001 |
| JP | 2005-314646 A | 11/2005 |
| JP | 2009-287012 A | 12/2009 |

OTHER PUBLICATIONS

Free ion diffusivity and charge concentration on cross-linked polymeric ionic liquid iongel films based on sulfonated zwitterionic salts and lithium ions. David Valverde et al. Published by the Royal Society of Chemistry on Apr. 5, 2019. (Year: 2019).*
Zhou et al., "In Situ Synthesis of Hierarchial Poly(ionic liquid)-Based Solid Electrolytes for High-Safety Lithium-ion and Sodium-ion Batteries", Nano Energy, published on-line Jan. 11, 2017, 34 pages.
Sigma Aldrich, 1-Allyl-3-methylimidazolium bis(trifluoromethylsulfonyl)imide, accessed at https://www.sigmaaldrich.com/catalog/product/aldrich/727695 on Aug. 31, 2020, 3 pages.
International Search Report and Written Opinion for PCT Application No. PCT/US20/31453 dated Oct. 14, 2020, 13 pages.
Japanese Patent Application No. 2022-567301 Office Action dated Jun. 4, 2024, 9 pages.
Japanese Patent Application No. 2022-567301 English Translation of Office Action dated Jun. 4, 2024, 10 pages.
Zhou et al., "In situ synthesis of hierarchical poly(ionic liquid)-based solid electrolytes for high-safety lithium-ion and sodium-ion batteries", Nano Energy, 2017, pp. 45-54.

* cited by examiner

*Primary Examiner* — Maria Laios
*Assistant Examiner* — Jordan E Berresford
(74) *Attorney, Agent, or Firm* — Cozen O'Connor

(57) ABSTRACT

A solid polymer electrolyte including a cross-linked ionic liquid (IL) matrix having functional group capable of interacting with lithium ions; polymerizable PEM formulations containing polymerizable ionic liquid (IL) materials (monomers) having functional group capable of interacting with lithium ions and a reactive polymerizable functional group capable of crosslinking; electrolytes prepared from a polymerizable formulation including a lithium conducting salt, a plasticizer, a cross-linker, and a polymerizable IL compound that contains at least one functional group capable of interacting with lithium ions and a reactive polymerizable functional group capable of crosslinking; electrochemical cells containing the electrolytes incorporating these solid PEMs containing the polymerized ionic liquid (IL) materials; and methods thereof are disclosed.

19 Claims, 8 Drawing Sheets

BIFUNCTIONAL IONIC LIQUIDS FOR ELECTROLYTES

FIELD

The present disclosure relates to a polymerizable polymer electrolyte material formulation, a solid polymer electrolyte, an electrochemical cell containing the solid polymer electrolyte and methods thereof.

BACKGROUND

As per information provided by the US Environmental Protection Agency (EPA) in 2017, the transportation sector alone accounts for 29% of the global greenhouse gas emissions. Adaption of electric vehicles around the world will help reduce this number substantially. With the global market for electric and hybrid electric vehicles growing, and lithium-ion (Li-ion) batteries a common feature in consumer electronics, developing batteries with high charge and discharge rates, long lifetimes and high energy densities is critical. Above all, the efforts need to focus on making these devices safe under normal and adverse conditions. Li-ion batteries have been heavily used in most consumer electronic devices after Sony commercialized the first battery in 1991. Electric Vehicles (EVs) competed for market dominance of personal vehicle sales in the early 20th century, but the advantages of the internal combustion engine (ICE), namely energy-dense fuel and more power, meant that EV development was sporadic and diffused until the 1990's when General Motors (GM) released its EV-1 and due to California's Zero-Emissions Vehicle (ZEV) mandate. One of the major components of EVs is the energy storage system (ESS) and improving the battery technology can have a potential impact on commercialization of EVs and help reduce the demand for fossil fuels. The battery is an expensive component of the vehicle or the device, and hence it is important for the battery to last the lifetime of the vehicle of the device. This means that the next generation Li-ion batteries used in EVs and electronic devices will require significant improvements in all components compared to current state-of-the art Li-ion technologies.

The shuttling of positive and negative ions between the battery electrodes is the main function of the electrolyte. Historically, researchers have focused on developing battery electrodes, and electrolyte development has been limited. Traditional Li-ion batteries used carbonate-based electrolytes that can transport lithium ions but are plagued with high flammability and volatility. A high portion of electrolyte research has been devoted to development of additives that can react on the electrodes to prevent or limit the reaction of the electrolyte with the electrodes. Flame retarding additives have also been studied but they do not prevent the adverse thermal reactions in batteries, and just limit the severity and scale of the fires.

Recently, room temperature ionic liquids (RTILs) have been studied extensively for their electrochemical properties, as they are promising materials for electrolytes in Li-ion batteries. Ionic liquids (ILs) are organic salts with a large cation and an inorganic anion, having melting points below 100° C. The lattice energy in ionic liquids is reduced due to the bulky cation and hence the melting point is lower. ILs are possible alternatives to conventional electrolytes for lithium batteries because of their negligible vapor pressure, non-flammability, wide electrochemical window, high chemical and thermal stability, and good ionic conductivity.

U.S. Pat. Nos. 6,727,024 and 6,395,429 to Kang et al. reports the use of lithium salt based solid electrolytes and dialkyl ethers as plasticizers, with acrylate and other functionalized cross-linkers. Due to inherent low ionic conductivity of cross-linker molecules used in prior art electrolytes, the art lacks the incorporation of bifunctional polymerizable ionic liquids to improve the ionic conductivity of high energy Li-ion and lithium-based batteries.

SUMMARY

In accordance with one aspect of the present disclosure, there is provided a polymerizable polymer electrolyte material (PEM) formulation including: a polymerizable ionic liquid (IL) monomer containing at least one functional group capable of interacting with lithium ions and a reactive polymerizable functional group capable of crosslinking the monomer; a lithium ion conducting salt; a plasticizer; and a cross-linker.

In accordance with another aspect of the present disclosure, there is provided a solid polymer electrolyte including: a cross-linked ionic liquid (IL) matrix including a polymer backbone having a functional group capable of interacting with lithium ions with a plurality of pendant groups, and wherein a plurality of cation moieties are attached to one or more of the plurality of pendant groups of the polymer backbone, the cationic moieties being at least one of a nitrogen cation moiety, a phosphorus cation moiety, and a sulfur cation moiety; a lithium ion conducting salt; and a plasticizer.

In accordance with another aspect of the present disclosure, there is provided an electrochemical cell including positive and negative electrodes spaced apart from each other in the solid polymer electrolyte.

In accordance with another aspect of the present disclosure, there is provided a method of making a solid polymer electrolyte including:
a. forming a reaction mixture including:
  i. a polymerizable ionic liquid (IL) monomer containing a functional group capable of interacting with lithium ions and a reactive polymerizable functional group, containing at least one of a nitrogen cation moiety, a phosphorous cation moiety, and a sulfur cation moiety,
  ii. a lithium ion conducting salt,
  iii. a plasticizer,
  iv. polymerization initiator and
  v. a cross-linker; and
b. initiating polymerization in the reaction mixture to form a PEM, wherein the bifunctional IL monomer forms a part of the core of the polymer structure.

These and other aspects of the present disclosure will become apparent upon a review of the following detailed description and the claims appended thereto.

DETAILED DESCRIPTION

Figure 1:
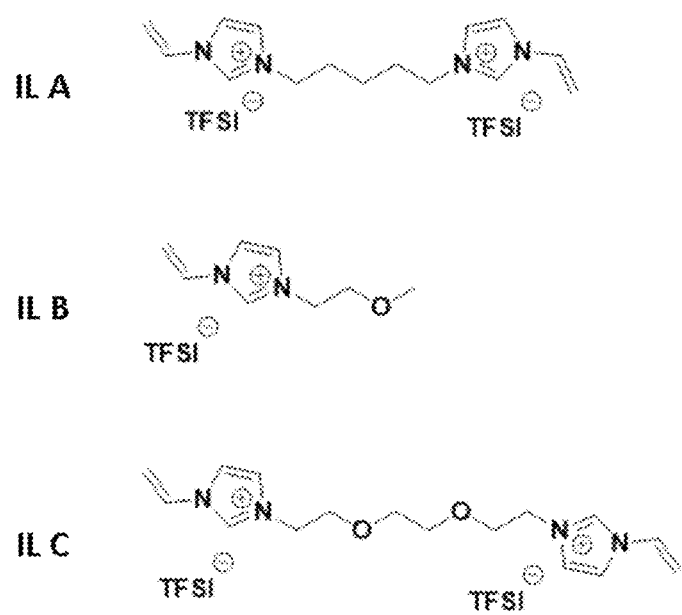
FIG. 1 shows the molecular structure of a prior art polymerizable IL monomer (ILA) and polymerizable IL monomers (ILB) and (ILC) in accordance with the present disclosure.

The disclosed technology relates generally to lithium battery electrolytes. Particularly, this technology is related to non-flammable, non-volatile solid-state electrolytes used for lithium ion transport. This technology also relates to electrolytes useful in energy storage systems suitable for use in consumer electronics and electric drive vehicles.

The present disclosure describes non-flammable and non-volatile solid electrolytes that overcome safety concerns in current state-of-the-art Li-ion batteries as well as next generation lithium-based batteries. The technology is based on innovative cross-linked polymerizable ILs that can form solid polymer electrolytes. The resultant ion-conducting polymer electrolyte materials (PEMs), including membranes, films, blocks or the like, simultaneously overcome the poor thermal and electrochemical stability and safety problems that have plagued lithium battery electrolytes for years. They provide a platform for engineering electrolytes with both chemical and mechanical tunability that expand the range of available battery form factors available for automotive applications as well as consumer electronics. Because of the intrinsic wide electrochemical stability windows of the cross-linked PEMs, they can be used to significantly enhance the operational temperature range and safety of all lithium-based batteries.

The disclosure relates to polymerizable ionic liquid (IL) materials (monomers) containing at least one functional group capable of interacting with lithium ions and one reactive polymerizable functional group; polymerizable PEM formulations containing the polymerizable ionic liquid (IL) materials (monomer); solid polymerized PEM containing the polymerized ionic liquid (IL) materials; and electrochemical cells containing the electrolytes incorporating these solid PEMs containing the polymerized ionic liquid (IL) materials.

A suitable polymerizable ionic liquid (IL) monomer contains a functional group capable of interacting with lithium ions and a reactive polymerizable functional group capable of crosslinking within the polymer. The phrase capable of interacting with lithium ions means to increase $Li^+$ ion conjugation in the polymer electrolyte material. A suitable lithium ion interacting functional group includes a single bond carbon-oxygen-carbon structure. Examples include ether, nitrile, silyl, fluoroalkyl, siloxane, sulfonate, carbonate, ester, ethylene oxide or combinations thereof. A suitable reactive polymerizable functional group capable of crosslinking within the polymer contains at least one of a nitrogen cation moiety, a phosphorous cation moiety and a sulfur cation moiety. Such suitable crosslinking functional groups include vinyl, allyl, acrylate, benzylvinyl or acryloyl groups.

In an embodiment of the present disclosure, there is provided a solid polymer electrolyte prepared from a formulation which includes a lithium ion conducting salt, a plasticizer, a cross-linker, a plurality of polymerizable ionic liquid (IL) monomers containing at least one functional group capable of interacting with lithium ions and a reactive polymerizable functional group capable of crosslinking within the polymer, and a photo-initiator. In an embodiment, an electrical energy storage device includes an electrolyte prepared from a formulation containing a) a lithium ion conducting salt; b) a plasticizer; c) a cross-linker; d) a plurality of polymerizable ionic liquid (IL) monomers containing at least one functional group capable of interacting with lithium ions and a reactive polymerizable functional group capable of crosslinking within the polymer; and e) a photo-initiator.

In an embodiment, the solid PEM electrolyte includes a polymerized IL matrix having a polymer backbone containing at least one functional group capable of interacting with lithium ions. The polymer backbone has a plurality of pendant groups having cationic moieties including at least one of a nitrogen cation moiety, a phosphorus cation moiety, and a sulfur cation moiety which are crosslinked in the polymer matrix by vinyl, allyl, acrylate, benzylvinyl or acryloyl groups. The PEM electrolyte further includes a lithium ion conducting salt and a plasticizer.

In an embodiment, the nitrogen cation moiety is selected from a group consisting of imidazolium, ammonium, pyridinium, piperidinium, pyrrolidinium, azepinium, and morpholinium moieties.

In an embodiment, the phosphorus cation moiety is selected from a group consisting of phosphonium moieties.

In an embodiment, the sulfur cation moiety is selected from a group consisting of sulfonium moieties.

In an embodiment, the polymerizable IL monomer includes a vinyl or allyl or acrylate imidazolium moiety, a vinyl or allyl or acrylate ammonium moiety, a vinyl or allyl or acrylate pyridinium moiety, a vinyl or allyl or acrylate piperidinium moiety, a vinyl or allyl or acrylate pyrrolidinium moiety, a vinyl or allyl or acrylate azepinium moiety, a vinyl or allyl or acrylate morpholinium moiety, a vinyl or allyl or acrylate phosphonium moiety, a vinyl or allyl or acrylate sulfonium moiety.

In an embodiment, the preferred polymerizable IL monomer includes vinyl imidazolium moiety, vinyl pyrrolidinium, acrylate ammonium moiety, acrylate pyrrolidinium moiety.

In accordance with an embodiment of the present disclosure, the crosslink of the crosslinked polymeric ionic liquid matrix includes at least one of a nitrogen cation moiety, a phosphorus cation moiety, and a sulfur cation moiety. In an embodiment, the crosslink of the crosslinked polymerizable IL is a gemini IL moiety.

In an embodiment, suitable molecular structures of polymerizable IL material containing a functional group capable of interacting with lithium ions are depicted in FIG. 1 as ILB and ILC. ILA is a comparative polymerizable IL material not containing a functional group (e.g., alkyl chain) capable of interacting with lithium ions.

In an embodiment, the polymerizable IL material containing a functional group capable of interacting with lithium ions is present in a range of from 0.1% to 50% by weight of each of the solid PEM electrolyte and the polymerizable PEM formulation.

In an embodiment, the lithium ion conducting salt is present in a range of from 10% to 50% by weight of each of the solid PEM electrolyte and the polymerizable PEM formulation. Suitable lithium ion conducting salts include $LiBF_4$, $LiNO_3$, $LiPF_6$, $LiAsF_6$, lithium bis(trifluoromethylsulfonyl)imide (LiTFSI), lithium bis(pentafluoroethylsulfonyl)imide, lithium trifluoroacetate, LiBoB, LiDFOB, LiPO$_2$F$_2$, or the like or mixtures thereof.

In an embodiment, a plasticizer capable of dissociating lithium ions, is present in a range of from 5% to 50% by weight of each of the solid PEM electrolyte and the polymerizable PEM formulation. In an embodiment, the plasticizer is a non-polymerizable RTIL. The ionic liquid contains an organic cation and an inorganic/organic anion, with suitable organic cations including N-alkyl-N-alkyl-imidazolium, N-alkyl-N-alkyl-pyrrolidinium, N-alkyl-N-alkyl-pyridinium, N-alkyl-N-alkyl-sulfonium, N-alkyl-N-alkyl-ammonium, N-alkyl-N-alkyl-piperidinium or the like, and suitable anions including tetrafluoroborate, hexafluorophosphate, bis(trifluoromethylsulfonyl)imide, bis (pentafluoroethylsulfonyl)imide, trifluoroacetate or the like.

In an embodiment, the plasticizer is a mono- or di-ether containing ethylene glycol. Suitable examples include ethylene glycol monomethyl ether, ethylene glycol monoethyl ether, propylene glycol methyl ether, diethylene glycol monomethyl ether, diethylene glycol monoethyl ether, ethylene glycol dimethyl ether, ethylene glycol diethyl ether, or mixtures thereof.

In an embodiment, a battery is provided including positive and negative electrodes separated from each other by the solid electrolyte described herein.

In an embodiment, a method of making a composite electrolyte includes (1) forming a reaction mixture including a polymerizable IL monomer containing a functional group capable of interacting with lithium ions and a reactive polymerizable functional group capable of crosslinking within the polymer containing at least one of a nitrogen cation moiety, a phosphorous cation moiety and a sulfur cation moiety, and (2) initiating polymerization in the reaction mixture to form a polymeric ionic liquid matrix.

In an embodiment, a polymerization initiator is present in a range of from 0.1% to 5% by weight of the polymerizable formulation. In an embodiment, the polymerization is a free radical polymerization reaction. In an embodiment, the reaction is initiated by heat, or by ultraviolet energy or by microwave energy. In an embodiment, the method further includes adding an initiator in the reaction mixture. In an embodiment, the polymerization is initiated by ultraviolet energy by using 2-Hydroxy-2-methylpropiophenone as the photo-initiator.

Polymerizable ionic liquids have been previously investigated for use as electrolytes. However, due to a decrease in the number of mobile ions and considerable elevation of Tg, such an approach of polymerizing conventional ionic liquid monomers was shown to significantly decrease the ionic conductivity. In accordance with the present disclosure functional groups capable of interacting with lithium ions were introduced in a bifunctional polymerizable IL monomer structure in order to increase the ionic conductivity of the polymer material. Such linkages in a polymer backbone allow for increase Li$^+$ ion conjugation, and hence faster transport of ions. Hence, the present bifunctional IL monomers provide IL-based PEMs with higher lithium transference numbers and improved thermal stability.

Polymerizable ILs are a class of functional polymers useful in a variety of applications. The repeating units of these polymers bear an electrolyte group (cation or anion). Ionic conductivity of the ILs depends on several factors: chemical nature of the polymer backbone, nature of ions and glass transition temperature (Tg). Apart from high ionic conductivity and high thermal stability, the present monomer ILs offer high Li$^+$ ion transference number. The high Li$^+$ ion transference number is a consequence of the cation immobilized to the polymer backbone and thereby not participating in the ionic conduction. For energy storage applications, film type, e.g., solid polymer, ion conductive materials are preferred over liquid electrolytes. Polymerizable groups can be appended to the ionic liquid constituents. As compared to liquid electrolytes, the solid polymers are lighter in weight and are more easily processed, treated and packaged.

An electrolyte for a lithium ion battery having improved ionic conductivity, thermal and mechanical stability is described. The electrolyte includes a polymerizable IL material that can be cast or formed into a variety of shapes such as films, membranes and blocks. The polymeric IL is formed from the crosslinking of polymerizable IL monomers and includes a backbone (that optionally can include ionic liquid moieties) and pendant ionic liquid groups (shown as paired positively and negatively charged particles). An embodiment of the ionic liquid PEM includes a bifunctional ionic liquid crosslink (crosslinkable gemini ionic liquid) that provides mechanical stability to the film and that further assists the ionic conductivity of the composite.

IL-based hybrid PEMs that exhibit high ionic conductivity, wide electrochemical stability and high thermal stability for applications in EVs or PHEVs are disclosed. These electrolytes can be incorporated into Li-metal batteries, Li-Sulfur batteries and Li ion batteries with high voltage cathodes. The vast range of anion and cation chemistries that can be combined to create ILs tailor-made or explicitly designed to complement a specific combination of electrode chemistries, also provides a largely untapped materials library that can address concerns about battery safety.

Shaplov et. al. in their review (Recent Advances in Innovative Polymer Electrolytes based on Poly (ionic liquid) s, 2015) reported the use poly (diallyldimethylammonium) bis (trifluoromethanesulfonyl) imide (TFSI), N-butyl-N-methylpyrrolidinium TFSI ionic liquid and LiTFSI salt to synthesize ion gels with ionic conductivity 0.1 mS/cm at 30° C. Another article by Porcarelli et al. (Design of ionic liquid like monomers towards easy-accessible single-ion conducting polymer electrolytes, 2018) reports a copolymer electrolyte based on lithium 3-[4-(2-(methacryloyloxy)ethoxy)-4oxobutanoyl)oxy) propylsulfonyl]-1-(trifluoromethylsulfonyl)imide and poly(ethyleneglycol) methyl ether methacrylate with highest ionic conductivity $1.9 \times 10^{-6}$ and $2 \times 10^{-5}$ S·cm$^{-1}$ at 25 and 70° C., respectively. All patents, patent applications and publications cited herein are hereby incorporated by reference in their entirety in order to describe the start of the art as known to those skilled therein as of the date of the disclosure described herein.

A bifunctional polymerizable IL monomer is an ionic liquid in which one or more polymerizable units are incorporated. In an ionic liquid monomer, the polymerizable feature can be located on the cation, or on the anion, or both the cation and the anion.

The bifunctionality of the IL is due to a) the reactive end groups capable of polymerization, and b) a functional group capable of interacting with lithium ions of the lithium conducting salt. A suitable functional group capable of interacting with lithium ions is selected from ether, nitrile, silyl, fluoroalkyl, siloxane, sulfonate, carbonate, ester or combinations thereof. Hence, commercial cross-linkers can be partially or fully replaced with bifunctional ILs to generate polymer electrolytes with enhanced ionic conductivity, without compromising the mechanical stability.

Figure 2:
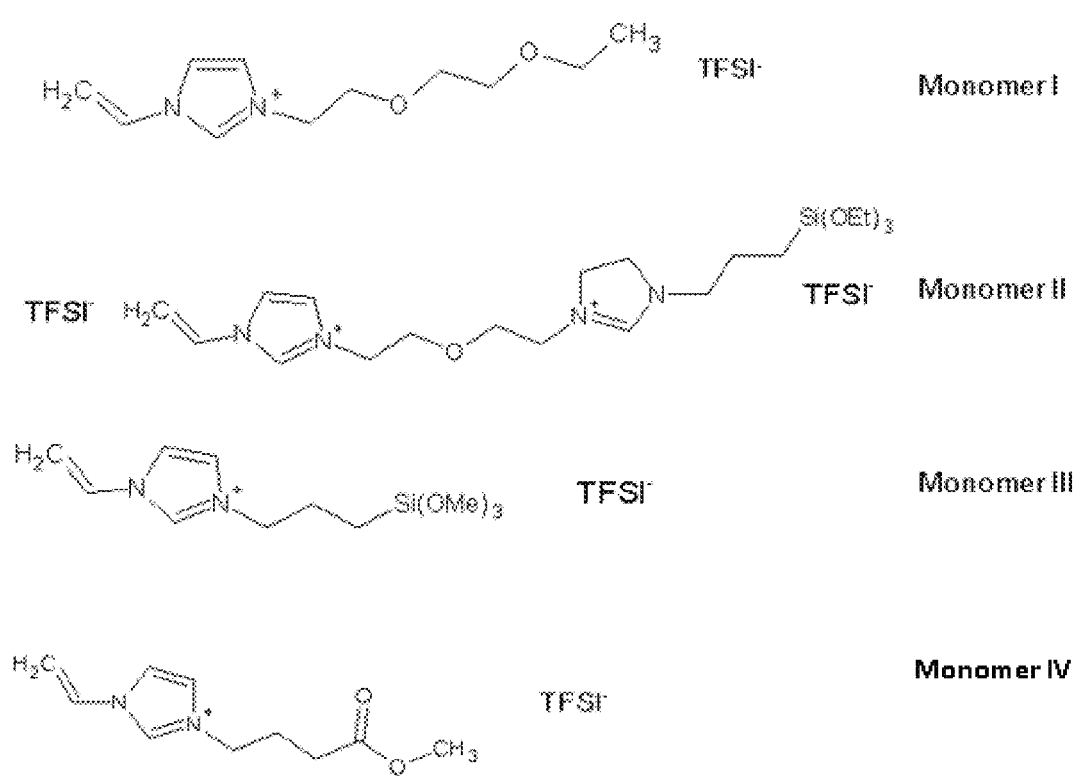
FIG. 2 shows the molecular structure of synthesized polymerizable IL monomers I-IV in accordance with the present disclosure.

Examples of IL monomers including a nitrogen cation moiety having a nitrogen cation selected from the group including but not limited to an imidazolium, ammonium, pyridinium, piperidinium, pyrrolidinium, azepinium, and morpholinium nitrogen cation moieties. These groups can be functionalized with side groups that are capable of polymerization. Polymerizable groups include vinyl, allyl, acrylate, benzylvinyl and acryloyl groups. These reactive groups are capable of free radical, thermal, ultra-violet or microwave-initiated polymerization, thereby incorporating the monomer IL into the polymer. FIG. 1 shows the molecular structure of a prior art polymerizable IL monomer ILA lacking a functional group capable of interacting with lithium ions in comparison with the molecular structure of polymerizable IL monomers ILB and ILC, used in the Examples for generating PEM films, each having incorporated in the monomer structure a functional group capable of interacting with lithium ions and a reactive polymerizable functional group capable of crosslinking the monomer. FIG. 2 shows the molecular structure of suitable polymerizable IL monomers I-IV each containing a functional group capable of interacting with lithium ions and a reactive polymerizable functional group capable of crosslinking the monomer.

Variations using ILs, including for example, imidazolium, ammonium, pyridinium, piperidinium, pyrrolidinium, azepinium, and morpholinium nitrogen cation moieties, as well as phosphonium and sulfonium cation moieties can also be used.

In one or more embodiments, a family of vinyl functionalized polymerizable imidazolium (Im), pyrrolidinium (Pyr) and piperidinium (Pip) cation-based monomer ILs are suitable for use as ionic polymer monomers. Vinyl monomer ionic liquids having bis(trifluoromethylsulfonyl)imide (TFSI) as counter ion can be synthesized.

Cross-Linkers

Figure 3:
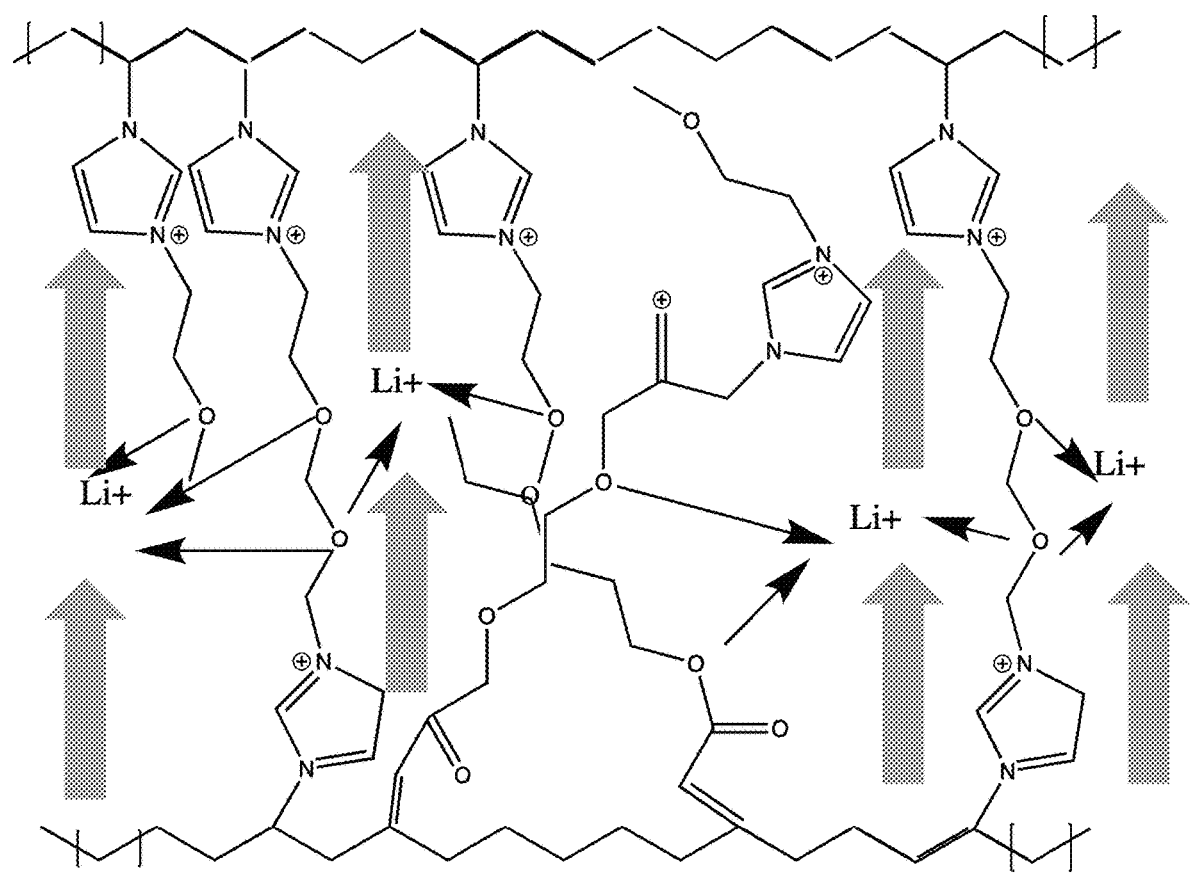
FIG. 3 shows a cross-linking solid electrolyte (PEM) design and synthesis.

The composite electrolyte also includes a crosslinker that crosslinks with the polymerizable ionic liquid (IL) monomer of the present disclosure and helps improve mechanical strength. Crosslinkers play a role in dictating the flexibility of the membrane. The crosslinker can be a conventional bifunctional molecule (IL monomer) or it can itself be an ionic liquid capable of polymerization. The bifunctional nature of the crosslinker (conventional IL monomer) creates bridges between polymer chains; however, the crosslinker can also be incorporated into a growing polymer chain. Conventional crosslinkers include moieties having two or more vinyl features, such as divinyl benzene, dimethacrylates and diacrylates. In reacting with the IL monomers, the crosslinking ionic liquid can form a bridge between two polymeric backbones, or it can become incorporated into the polymeric backbone, thereby increasing the ion conductivity of the polymer itself. This is shown in FIG. 3 with the cross-linker and the monomer IL each having ether groups, which allow for faster Li$^+$ ion transport.

Figure 8:
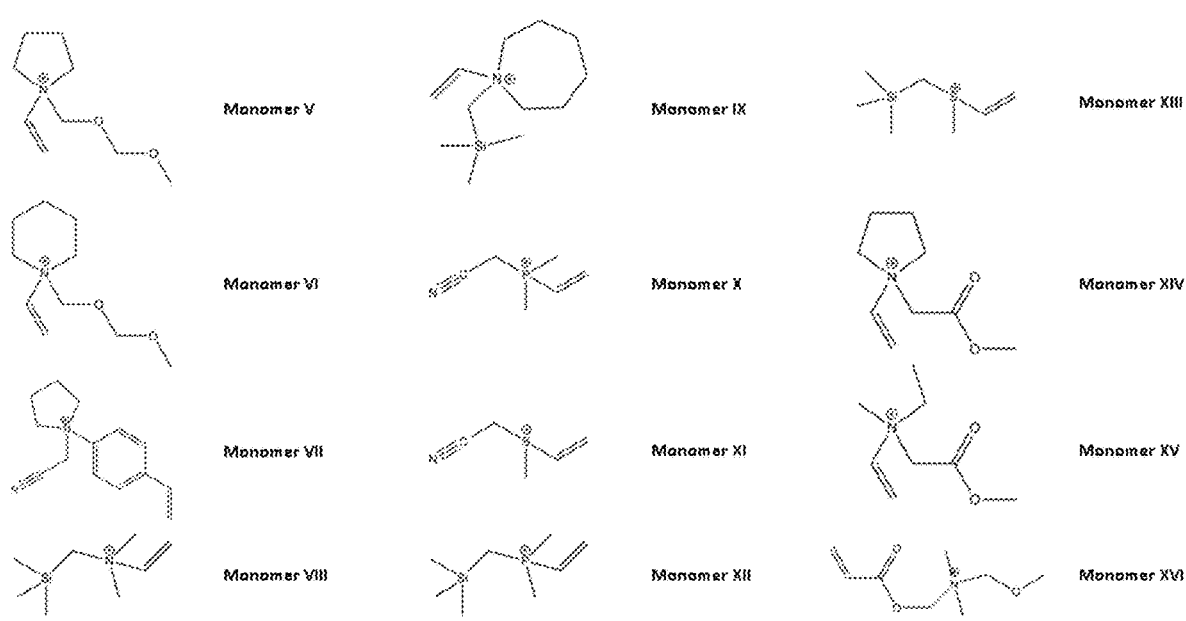
FIG. 8 shows the molecular structures of polymerizable IL monomers V-XVI in accordance with the present disclosure.

FIG. 8 shows the molecular structures of polymerizable IL monomers V-XVI each containing a functional group capable of interacting with lithium ions and a reactive polymerizable functional group capable of crosslinking within the polymer. FIG. 8 depicts various suitable bifunctional polymerizable ionic liquid (IL) monomers comprising vinyl pyrrolidinium cation with ether oxygen functional moieties (Monomer V), vinyl piperidinium cation with ether oxygen functional moieties (Monomer VI), styrene pyrrolidinium cation with nitrile functional moieties (Monomer VII), vinyl ammonium cation with trimethyl silyl functional moieties (Monomer VIII), vinyl piperidinium cation with trimethyl silyl functional moieties (Monomer IX), vinyl phosphonium cation with nitrile functional moieties (Monomer X), vinyl sulfonium cation with nitrile functional moieties (Monomer XI), vinyl phosphonium cation with trimethyl silyl functional moieties (Monomer XII), vinyl sulfonium cation with trimethyl silyl functional moieties (Monomer XIII), vinyl pyrrolidinium cation with carbonyl functional moieties (Monomer XIV), vinyl ammonium cation with carbonyl functional moieties (Monomer XV), acrylate ammonium cation with ether oxygen functional moieties (Monomer XVI).

Various Types of Acrylate Cross-Linkers

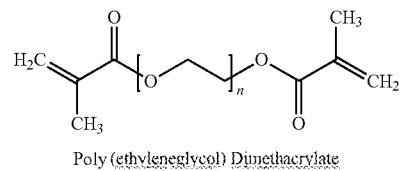

Poly (ethyleneglycol) Dimethacrylate

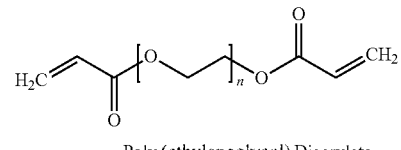

Poly (ethyleneglycol) Diacrylate

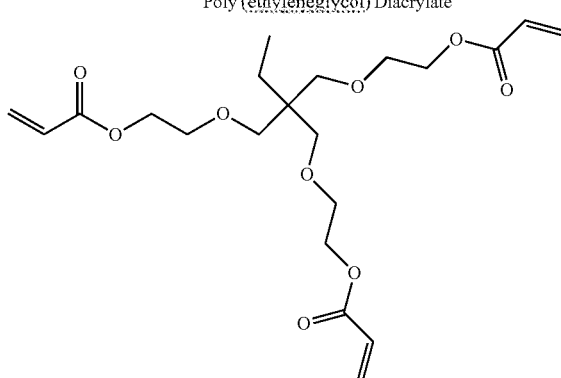

Ethoxylated Trimethylolpropane Triacrylate

The disclosure will be further illustrated with reference to the following specific examples. It is understood that these examples are given by way of illustration and are not meant to limit the disclosure or the claims to follow.

Figure 4:
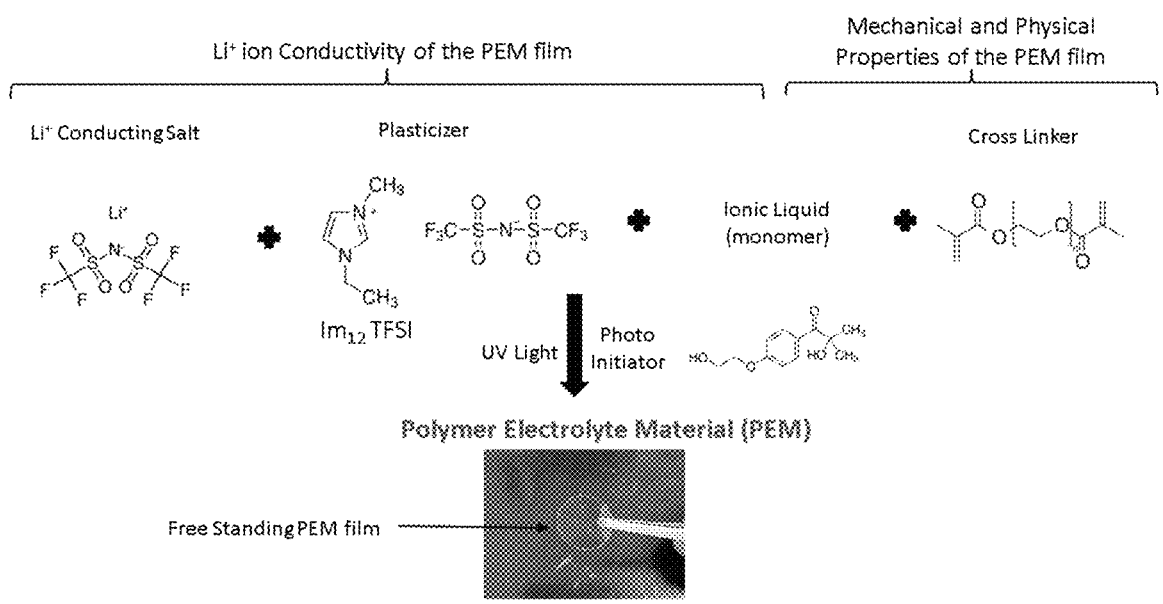
FIG. 4 shows an embodiment of an ion conduction mechanism in the PEM films synthesized using polymerizable IL monomers in accordance with the present disclosure.

Example A—the PEM Films of Comparison Example (CE) 1, CE 2, CE 3 and Example 1 were made from formulations containing a lithium conducting salt, monomer ILs, plasticizers and cross-linkers and polymerized by UV radiation using a photo initiator. The cross-linkers are responsible for mechanical strength, whereas the plasticizer helps dissociate the salt, hence increasing the ionic conductivity. Due to its bifunctional nature, the monomer ILs provide a balance between the ionic conductivity and mechanical properties of the PEM films. The individual components of the PEM films are mixed using a centrifugal mixer yielding highly viscous polymer gels. The viscous polymer gels are drop-casted on a glass plate and the plate is passed under UV light to generate PEM films having 50 m thickness as shown in FIG. 4. FIG. 4 illustrates an ion conduction mechanism in the PEM films synthesized using polymerizable IL. monomers. The degree of cross-linking can be tuned by changing the UV light exposure time and intensity.

TABLE A
Electrolyte Compositions:
| Electrolyte Composition | CE 1 | CE 2 | CE 3 | Example 1 |
|---|---|---|---|---|
| LiTFSI | 20 | 20 | 35 | 35 |
| 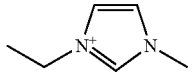 (ethylmethylimidazolium $(CF_3SO_2)_2N^-$) | | 45 | 40 | 40 |
| 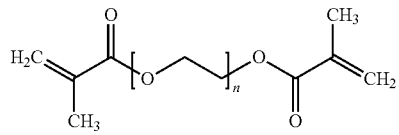 (PEG dimethacrylate) | 40 | 5 | 5 | |
| 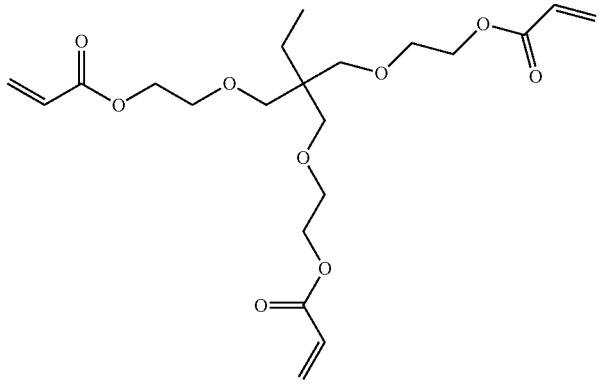 [SMILES: C=CC(=O)OCCOCC(CC)(COCCOC(=O)C=C)COCCOC(=O)C=C] (trifunctional acrylate) | | 30 | 10 | 10 |
| 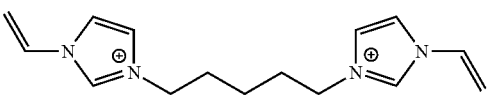 ILA | | 40 | 5 | 10 |
| 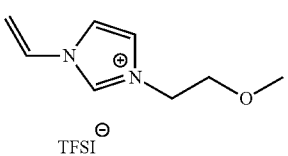 ILB | | | | 5 |
| 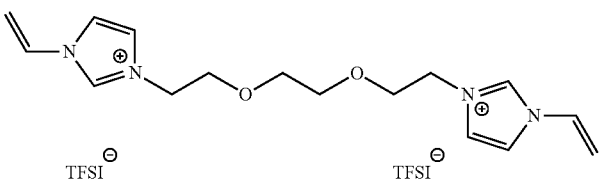 ILC | | | | 10 |

Example B—Synthesis of Im(vinyl)methylethyl-ether-TFSI (ILB)

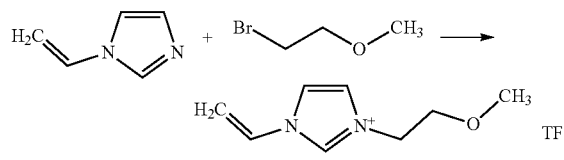

| Reagent | MW | Equiv | Mol | Mass (g) | Density | Volume (mL) | Conc | Yield (calc) |
|---|---|---|---|---|---|---|---|---|
| 1-vinylimidazole | 94.12 | 1.00 | 0.021 | 2.0 | 1.039 | 1.9 | | |
| 2-bromoethyl methylether | 139.00 | 1.00 | 0.021 | 3.0 | 1.478 | 2.0 | | |
| neat | | | | #DIV/0! | | | | |
| Im(vinyl)methylethyl-ether-Br | 233.12 | 1.00 | 0.021 | 5.0 | | | | 5.0 |
| DI water | | | | 32.7 | 1.00 | 32.7 | 40% | |
| LiTFSI 3M 79.9% | 287.09 | 1.05 | 0.023 | 8.1 | | | | |
| Im(vinyl)methylethyl-ether-TFSI | 433.37 | | | | | | | 9.3 |

Quaternization

To a 20 mL vial equipped with a magnetic stirring bar was added 1-vinylimidazole. While stirring at room temperature (RT), 2-bromoethyl methylether was added. No exotherm was observed. The reaction was monitored by TLC (silica gel 50% EtOAc/DCM) against starting vinylimidazole. Unreacted vinylimidazole was present in much smaller proportions relative to product which does not migrate from the origin. The amber mixture stirred at RT for 96 h and a viscous amber oil was formed. Yield: amber oil, 5.0 g (>99%).

Metathesis

To the 20 mL vial containing the dibromide from step 1 was added DI water (20 mL) and to this solution was added lithium bis(trifluoromethylsulfonyl)imide dissolved in DI water (10 mL). A cloudy precipitate forms immediately, after which, an amber liquid layer separates from the water. The mixture stirred at RT for 1 h. The water layer was decanted, DCM (10 mL) is added and the entire mixture is poured into a separatory funnel. The organic layer is washed with DI water (2×10 mL), separated, dried over $MgSO_4$ and the solvent stripped by rotary evaporation. Yield: light amber oil, 7.8 g (84%).

FTIR: 3151, 1346, 1176, 1051 $cm^{-1}$.

$H^+$ NMR: (CDCl3) δ ppm 8.95 (s, 1H), 7.59 (s, 1H), 7.52 (s, 1H), 7.13 (q, 1H), 5.77 (dd, 1H), 5.45 (dd, 1H), 4.41 (t, 2H), 3.74 (t, 2H), 3.37 (s, 3H). $F^{19}$ NMR: (CDCl3) δ ppm −79.03 (s).

Example C—Synthesis of [Im(vinyl)]2-triethyleneglycol-TFSI (ILC)

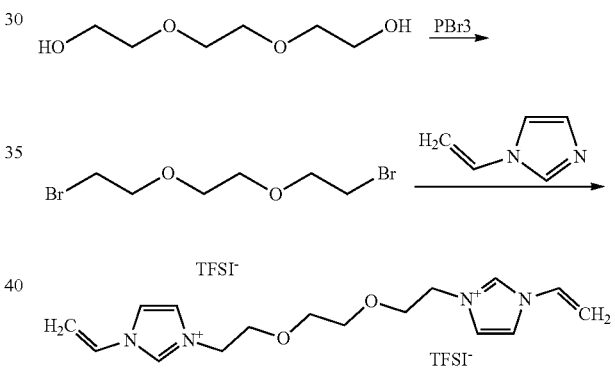

| Reagent | MW | Equiv | Mol | Mass (g) | Density | Volume (mL) | Conc | Yield (calc) |
|---|---|---|---|---|---|---|---|---|
| triethyleneglycol | 150.17 | 1.00 | 0.033 | 5.0 | 1.130 | 4.4 | | |
| PBr3 | 270.69 | 1.00 | 0.033 | 9.0 | 2.850 | 3.2 | | |
| DCM | | | | 46.7 | 1.326 | 35.2 | 30% | |
| dibromo-triethyleneglycol | 275.97 | 1.00 | | | | | | 9.2 |
| P(OH)2-Br | 144.00 | 1.00 | | | | | | 4.8 |

| Reagent | MW | Equiv | Mol | Mass (g) | Density | Volume (mL) | Conc | Yield (calc) |
|---|---|---|---|---|---|---|---|---|
| dibromo-triethyleneglycol | 275.97 | 1.00 | 0.024 | 6.5 | | #DIV/0! | | |
| 1-vinylimidazole | 94.12 | 2.00 | 0.047 | 4.4 | 1.03 | 4.3 | | |
| neat | | | | 21.9 | | #DIV/0! | 50% | |
| [Im(vinyl)]2-triethyleneglycol-Br | 464.21 | 1.00 | 0.019 | 8.8 | | | | 10.9 |
| DI water | | | | 56.9 | 1.00 | 56.9 | 40% | |
| LiTFSI 3M 79.9% | 287.09 | 2.05 | 0.039 | 13.9 | | | | |
| [Im(vinyl)]2-triethyleneglycol-TFSI | 864.71 | | | | | | | 16.4 |

Conversion to Dibromide

To a 100 mL 3-neck flask equipped with a magnetic stirring bar, water-cooled condenser, $N_2$ inlet and thermocouple were added triethyleneglycol and DCM (30 mL). The mixture was cooled in an ice/salt bath to 2° C. While stirring at 2° C., phosphoroustribromide was added dropwise by syringe and maximum exotherm to 11° C. was observed. The mixture slowly returned to RT and stirred for 72 h. The light blue solution was quenched dropwise until DI water (10 mL) could be added. The mixture was poured into a separatory funnel. The organic phase was extracted into DCM, separated, dried over $MgSO_4$ and the solvent stripped by rotary evaporation. Yield: colorless oil, 6.5 g, (71%).

Quaternization

To a 100 mL RB containing the mixture from step A was added 1-vinylimidazole. No exotherm was observed and the mixture stirred at RT under neat conditions for 7 days. The mixture became a pale white solid. The solid was slurried in DCM (30 mL) and collected by vacuum filtration. The mother liquor removed unreacted starting materials and yellow color. Yield: pale white solid, 8.8 g (81%).

Metathesis

To a 100 mL bottle equipped with a magnetic stirring bar was dissolved in DI water (20 mL), the bromide from step 1 and combined with a solution of lithium bis(trifluoromethylsulfonyl)imide dissolved in 20 mL DI water. A cloudy precipitate quickly formed and a pale, yellow oil deposited on the bottom. The mixture stirred at RT for 2 h. The water layer was decanted, DCM (20 mL) is added and the entire mixture is poured into a separatory funnel. The organic layer is washed with DI water (2×10 mL), separated, dried over $MgSO_4$ and the solvent stripped by rotary evaporation. Yield: light yellow oil, 14.8 g (90%).

FTIR: 3151, 1347, 1176, 1050 $cm^{-1}$.

$H^+$ NMR: (DMSO-d6) δ ppm 9.40 (s, 2H), 8.18 (t, 2H), 7.84 (t, 2H), 7.30 (q, 2H), 5.95 (dd, 2H), 5.43 (dd, 2H), 4.36 (t, 4H), 3.77 (t, 4H), 3.56 (s, 4H). $F^{19}$ NMR: (CDCl3) δ ppm −78.75 (s).

Figure 5:
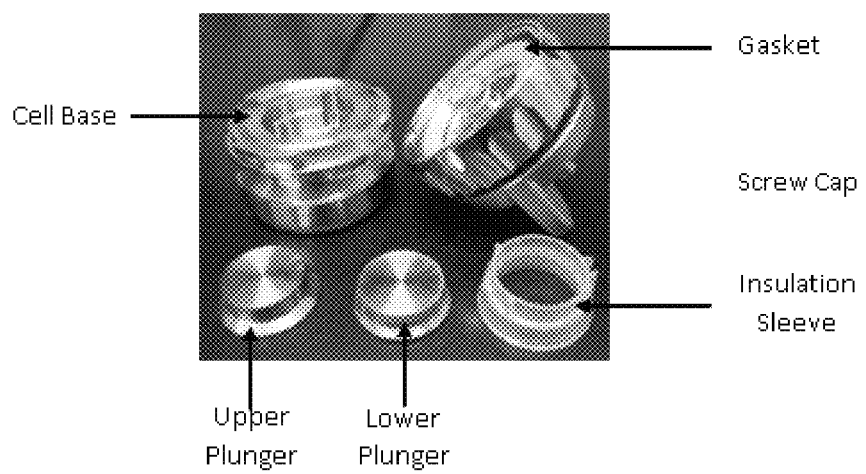
FIG. 5 is picture depicting the individual parts of a Swagelok Cell used to measure the ionic conductivity of the PEM films.

The ionic conductivity is calculated based on the bulk resistance of the PEM film obtained from the Nyquist Plots using the formula below. Disclosed films sandwiched between the upper and lower plungers in a Swagelok cell, with cells hermetically sealed for better contact than coin cells, hence lowering the interfacial resistance. FIG. 5 illustrates a picture of the individual parts of a Swagelok Cell used to measure the ionic conductivity of the PEM films.

$$\sigma = \frac{t}{R*A}$$

In the above formula, a is the ionic conductivity calculated using the thickness (t) and area (A) of the PEM films, and R is the bulk resistance obtained from the Nyquist plots.

TABLE B

Ionic Conductivity data at different temperatures:

| Conductivity (mS/cm) | CE 1 PEM | CE 2 PEM | CE 3 PEM | Example 1 PEM |
|---|---|---|---|---|
| 25° C. | <0.05 | 0.17 | 0.37 | 0.82 |
| 35° C. | <0.1 | 0.34 | 0.52 | 1.23 |
| 45° C. | <0.1 | 0.56 | 0.81 | 1.77 |

Figure 6:
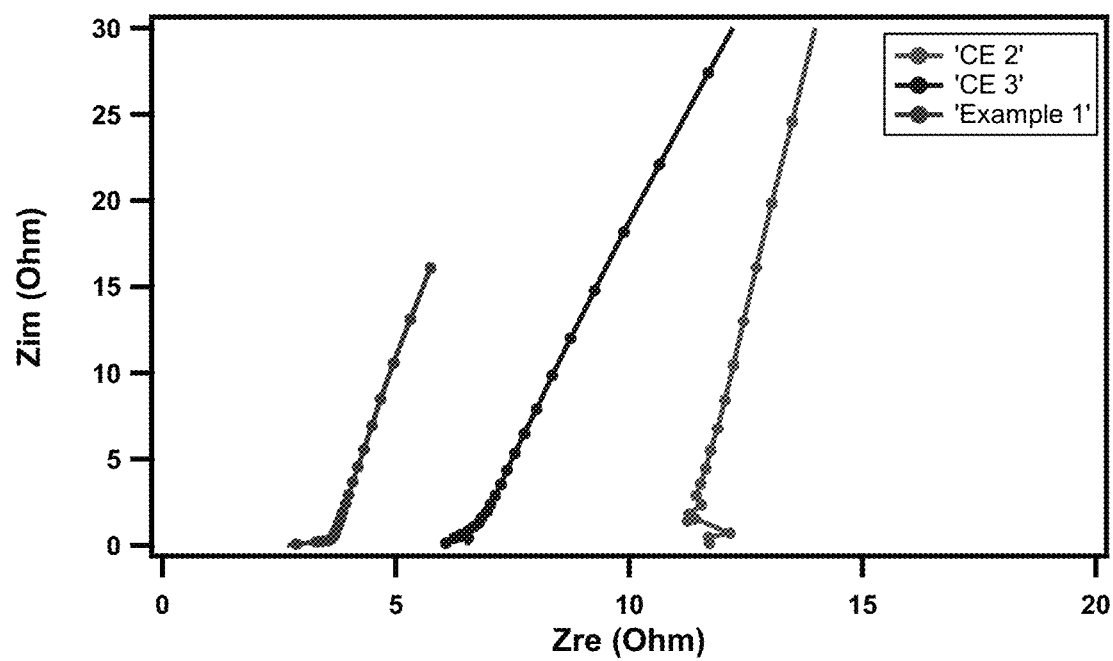
FIG. 6 shows Nyquist Plots used to calculate ionic conductivity of PEM films based on the bulk resistance.

The ionic conductivity data for PEM films is reported in a temperature range of from 25 to 45° C., which is considered standard operating temperature conditions for lithium-based batteries in various applications. Without any plasticizer in CE 1 films, we can see low ionic conductivity values less than 0.05 mS/cm at room temperature. These films have a higher loading of cross-linker than films containing ILA where the monomer IL does not have EO groups in the molecular structure, resulting in low conductivity PEMs. Increasing the $Li^+$ ion conducting salt and optimizing the cross-linker concentration increases the ionic conductivity in CE 3 films compared to CE 2 films. As seen in FIG. 1, ILB and ILC have EO groups attached to mono-vinyl imidazole and di-vinyl imidazole moieties, respectively. This leads to better $Li^+$ ion conjugation with the oxygen in the IL, leading to faster ion movement, as shown in FIG. 3. Example 1 PEMs are further optimized using the triacrylate cross-linker B, with 3 reactive sites, leading to more cross-linked PEM films, and hence only 10 wt. % is needed in the formulation. The ionic conductivity values are calculated using Nyquist plots which can be seen in FIG. 6, and we can see the impedance (resistance=R) reducing for Example 1 films compared to CE 2 films. FIG. 6 shows the Nyquist Plots used to calculate ionic conductivity of the PEM films based on the bulk resistance. Hence, we see the room temperature (25° C.) ionic conductivity increase from 0.33 $mS \cdot cm^{-1}$ in CE 3 PEM to 0.82 $mS \cdot cm^{-1}$ in Example 1 PEM (Table B). It is important to note that these are solid PEM films without any liquid or gel component and can achieve high ionic conductivity values at room temperature.

Traditional liquid electrolytes contain flammable carbonate co-solvents which have very poor thermal stability, and hence Li-ion batteries with these electrolytes have safety issues. In order to study the thermal stability of monomer IL containing PEM films, we conducted Thermogravimetric Analysis (TGA). The scan was conducted in the temperature range of from 20 to 500° C., with a ramping rate of 5° C./min.

Figure 7:
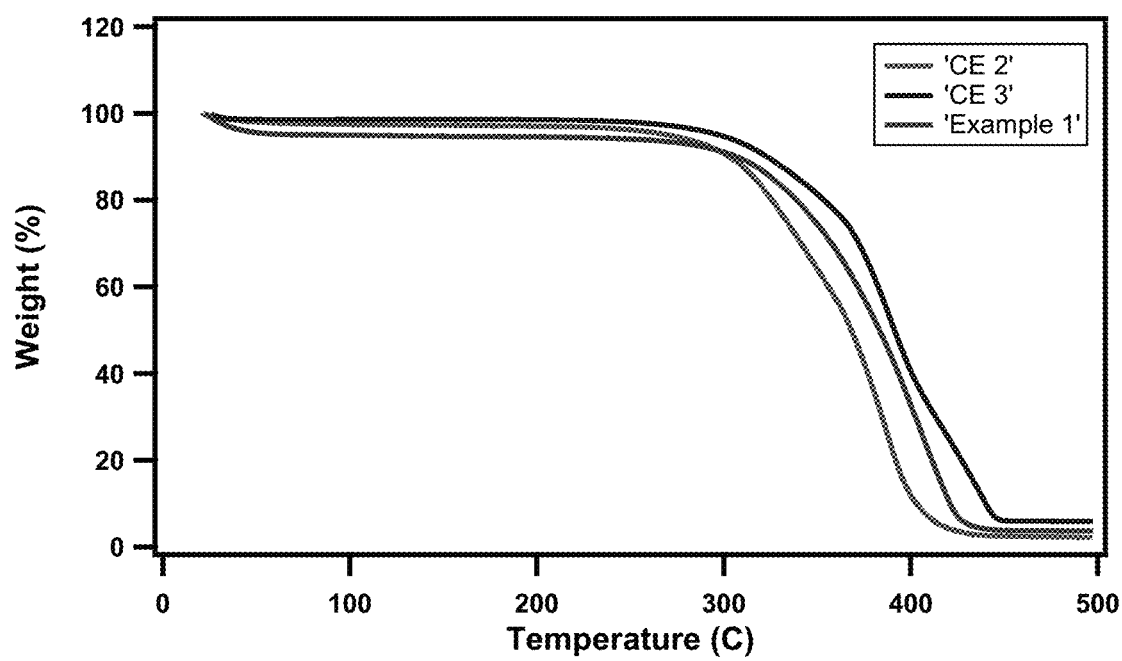
FIG. 7 shows the TGA data for PEM films showing excellent thermal stability at high temperatures.

FIG. 7 depicts the plots of TGA data for CE 2 an CE 3 PEM films compared to the Example 1 PEM film showing excellent thermal stability at high temperatures. Example 1 PEM films, as well as CE 2 and CE 3, have excellent thermal stability even above 250° C., and thus can enhance the safety of lithium-based batteries. Use of PEMs in accordance with the present disclosure in lithium-based batteries will allow for safer operations in a wide temperature window.

Example D—Synthesis of
Im(Vinyl)-Diethyleneglycol-Monoethyl-Ether-TFSI
(Monomer IL I)

| Reagent | MW | Equiv | Mol | Mass (g) | Density | Volume (mL) | Conc | Yield (calc) |
|---|---|---|---|---|---|---|---|---|
| diethyleneglycol monoether ether | 134.18 | 1.00 | 0.037 | 5.0 | 0.990 | 5.1 | | |
| PBr3 | 270.69 | 1.00 | 0.037 | 10.1 | 2.850 | 3.5 | | |

-continued

| Reagent | MW | Equiv | Mol | Mass (g) | Density | Volume (mL) | Conc | Yield (calc) |
|---|---|---|---|---|---|---|---|---|
| DCM | | | | 50.3 | 1.326 | 37.9 | 30% | |
| bromo-diethyleneglycol monoethyl ether | 197.07 | 1.00 | | | | | | 7.3 |

| Reagent | MW | Equiv | Mol | Mass (g) | Density | Volume (mL) | Conc | Yield (calc) |
|---|---|---|---|---|---|---|---|---|
| bromo-diethyleneglycol monoethyl ether | 197.07 | 1.00 | 0.026 | 5.1 | | #DIV/0! | | |
| 1-vinylimidazole | 94.12 | 1.00 | 0.026 | 2.4 | 1.039 | 2.3 | | |
| neat | | | | 15.1 | | #DIV/0! | 50% | |
| Im(vinyl)diethyleneglycol monoethyl ether-Br | 291.19 | 1.00 | 0.026 | 7.5 | | | | 7.5 |
| DI water | | | | 43.0 | 1.00 | 43.0 | 40% | |
| LiTFSI 3M 79.9% | 287.09 | 1.05 | 0.027 | 9.7 | | | | |
| Im(vinyl)diethyleneglycol monoethyl ether-TFSI | 491.44 | | | | | | | 12.7 |

Conversion to Bromide

To a 100 mL 3-neck flask equipped with a magnetic stirring bar, water-cooled condenser, N2 inlet and thermocouple were added diethyleneglycol-monoethyl-ether and DCM (30 mL). The mixture was cooled in an ice/salt bath to 2° C. While stirring at 2° C., phosphoroustribromide was added dropwise by syringe and maximum exotherm to 9° C. was observed. The mixture slowly returned to RT and stirred for 18 h. The light blue solution was quenched dropwise until DI water (10 mL) could be added. The mixture was poured into a separatory funnel. The organic phase was extracted into DCM, separated, dried over MgSO4 and the solvent stripped by rotary evaporation. Yield: colorless oil, 5.1 g, (70%).

Quaternization

To a 20 mL vial containing the mixture from step A was added 1-vinylimidazole. No exotherm was observed and the mixture stirred at RT under neat conditions. The reaction was monitored by TLC (silica gel, 50% EtOAc/DCM). Unreacted vinylimidazole was present in much smaller proportions relative to product which does not migrate from the origin. The amber mixture stirred at RT for 9 days and a viscous light amber oil was formed. Yield: light amber oil, 7.5 g (>99%).

Metathesis

To a 50 mL bottle equipped with a magnetic stirring bar was dissolved in DI water (20 mL), the bromide from step 1 and combined with a solution of lithium bis(trifluoromethylsulfonyl)imide dissolved in 20 mL DI water. A cloudy precipitate quickly formed and a pale, yellow oil deposited on the bottom. The mixture stirred at RT for 2 h. The water layer was decanted, DCM (20 mL) is added and the entire mixture is poured into a separatory funnel. The organic layer is washed with DI water (2×10 mL), separated, dried over MgSO4 and the solvent stripped by rotary evaporation. Yield: light yellow oil, 10.2 g (80%).

FTIR: 3151, 1347, 1177, 1051 cm$^{-1}$.

H$^+$ NMR: (CDCl3) δ ppm 9.03 (s, 1H), 7.63 (t, 1H), 7.58 (t, 1H), 7.10 (q, 1H), 5.78 (dd, 1H), 5.45 (dd, 1H), 4.43 (t, 2H), 3.86 (t, 2H), 3.65 (t, 2H), 3.58 (t, 2H), 3.51 (q, 2H), 1.19 (t, 3H). F$^{19}$ NMR: (CDCl3) δ ppm −79.01 (s).

Example E—Synthesis of Im(Vinyl)(2HImTEOS)-Diethylether-TFSI (Monomer IL II)

| Reagent | MW | Equiv | Mol | Mass (g) | Density | Volume (mL) | Conc | Yield (calc) |
|---|---|---|---|---|---|---|---|---|
| 1-vinylimidazole | 94.12 | 1.00 | 0.005 | 0.5 | 1.039 | 0.5 | | |
| Bis(2-bromoethyl)ether | 231.92 | 1.00 | 0.005 | 1.2 | 1.857 | 0.7 | | |
| 2HIm3TEOS* | 274.43 | 1.00 | 0.005 | 1.5 | 1.005 | | | |
| Im(vinyl)Im(MeOAc)-diethylether-Br | 600.47 | 1.00 | 0.005 | 3.2 | | | | 3.2 |
| DI water | | | | 17.9 | 1.00 | 17.9 | 40% | |
| LiTFSI 3M 79.9% | 287.09 | 2.05 | 0.011 | 4.0 | | | | |
| Im(vinyl)Im(MeOAc)-diethylether-TFSI | 1000.97 | | | | | | | 5.3 |

*N-(3-triethoxysilylpropyl)-4,5-dihydrlimidazole

Quaternization

To a 20 mL vial equipped with a magnetic stirring bar was added N-(3-triethoxysilylpropy)-4,5-dihydroimidazole, distilled under vacuum, colorless oil (pot, 135° C.; p, 0.25-0.11 mmHg; vapor, 96-109° C.) and 1-vinylimidazole and DCM (5 mL). While stirring at RT, bis(2-bromoethyl)ether was added to the mixture. No exotherm was observed. The reaction was monitored by TLC (silica gel 50% EtOAc/DCM) against starting vinylimidazole. Unreacted vinylimidazole was present in much smaller proportions relative to product which does not migrate from the origin. The amber mixture stirred at RT for 5 days and a highly viscous amber gel formed. Yield: viscous amber gel, 3.2 g (>99%).

Metathesis

To the 20 mL vial containing the dibromide from step 1 was added DI water (20 mL) and to this solution was added lithium bis(trifluoromethylsulfonyl)imide dissolved in DI water (10 mL). A cloudy precipitate forms immediately, after which, a light, yellow oil layer separates from the water. The mixture stirred at RT for 1 h. The water layer was decanted, DCM (10 mL) was added and the entire mixture was poured into a separatory funnel. The organic layer was washed with DI water (2×10 mL), separated, dried over MgSO4 and the solvent stripped by rotary evaporation. Yield: amber oil, 4.2 g (79%).

FTIR: 2977, 1654, 1179, 1051 cm$^{-1}$.

H$^+$ NMR: (CDCl3) δ ppm 9.35 (s, 2H), 8.15 (s, 2H), 7.81 (s, 2H), 7.26 (q, 2H), 5.93 (dd, 2H), 5.43 (d, 2H), 4.38 (m, 4H), 3.81 (m, 4H). F$^{19}$ NMR: (CDCl3) δ ppm −78.88 (s), −79.30 (s).

Example F—Synthesis of Im(vinyl)propyl-TMOS-TFSI (Monomer IL III)

| Reagent | MW | Equiv | Mol | Mass (g) | Density | Volume (mL) | Conc | Yield (calc) |
|---|---|---|---|---|---|---|---|---|
| 1-vinylimidazole | 94.12 | 1.00 | 0.011 | 1.0 | 1.039 | 1.0 | | |
| 3-iodopropyltrimethoxysilane neat | 290.17 | 1.00 | 0.011 | 3.1 #DIV/0! | 1.482 | 2.1 | | |
| Im(vinyl)propyl-TMOS-I | 384.29 | 1.00 | 0.011 | 4.1 | | | | 4.1 |
| DI water | | | | 20.3 | 1.00 | 20.3 | 40% | |
| LiTFSI 3M 79.9% | 287.09 | 1.05 | 0.011 | 4.0 | | | | |
| Im(vinyl)propyl-TMOS-TFSI | 537.53 | | | | | | | 5.7 |

Quaternization

To a 20 mL vial equipped with a magnetic stirring bar was added 1-vinylimidazole. While stirring at RT, (3-iodopropyl)trimethoxysilane was added. No exotherm was observed. The reaction was monitored by TLC (silica gel 50% EtOAc/DCM) against starting vinylimidazole. Unreacted vinylimidazole was present in much smaller proportions relative to product which does not migrate from the origin. The amber mixture stirred at RT for 4 days and a viscous amber oil was formed. Yield: amber oil, 4.1 g (>99%).

Metathesis

To the 20 mL vial containing the dibromide from step 1 was added DI water (20 mL) and to this solution was added lithium bis(trifluoromethylsulfonyl)imide dissolved in DI water (10 mL). A cloudy precipitate forms immediately, after which, an amber liquid layer separates from the water. The mixture stirred at RT for 1 h. The water layer was decanted, DCM (10 mL) is added and the entire mixture is poured into a separatory funnel. The organic layer is washed with DI water (2×10 mL), separated, dried over MgSO4 and the solvent stripped by rotary evaporation. Yield: light amber oil, 5.4 g (95%).

FTIR: 2948, 1348, 1178, 1051 cm$^{-1}$.

H$^+$ NMR: (CDCl3) δ ppm 9.03 (s, 1H), 7.62 (t, 1H), 7.43 (t, 1H), 7.15 (q, 1H), 5.79 (dd, 1H), 5.44 (dd, 1H), 4.25 (t, 2H), 3.57 (s, 9H), 2.01 (q, 2H), 0.63 (t, 2H). F$^{19}$ NMR: (CDCl3) δ ppm −79.01 (s).

Example G—Synthesis of Im(vinyl)methylbutyrate-TFSI (Monomer IL IV)

| Reagent | MW | Equiv | Mol | Mass (g) | Density | Volume (mL) | Conc | Yield (calc) |
|---|---|---|---|---|---|---|---|---|
| 1-vinylimidazole | 94.12 | 1.00 | 0.021 | 2.0 | 1.039 | 1.9 | | |
| methyl-4-bromobutyrate neat | 181.03 | 1.00 | 0.021 | 3.8 #DIV/0! | 1.434 | 2.7 | | |
| Im(vinyl)methylbutyrate-Br | 275.15 | 1.00 | 0.021 | 5.8 | | | | 5.8 |
| DI water | | | | 34.4 | 1.00 | 34.4 | 40% | |
| LiTFSI 3M 79.9% | 287.09 | 1.05 | 0.022 | 7.9 | | | | |
| Im(vinyl)methylbutyrate-TFSI | 475.40 | | | | | | | 10.0 |

Quaternization

To a 20 mL vial equipped with a magnetic stirring bar was added methyl-4-bromobutyrate and 1-vinylimidazole. No exotherm was observed. The amber mixture stirred at RT for 7 days and a highly viscous amber gel formed. Yield: viscous amber gel, 5.8 g (>99%).

Metathesis

To the 20 mL vial containing the dibromide from step 1 was added DI water (20 mL) and to this solution was added lithium bis(trifluoromethylsulfonyl)imide dissolved in DI water (10 mL). A cloudy precipitate forms immediately, after which, a light, yellow oil layer separates from the water. The mixture stirred at RT for 1 h. The water layer was decanted, DCM (10 mL) was added (only partially soluble) and the entire mixture was poured into a separatory funnel. The organic layer was washed with DI water (2×10 mL), separated, dried over MgSO4 and the solvent stripped by rotary evaporation. Yield: light yellow oil, 9.3 g (93%).

FTIR: 3149, 1730, 1347, 1174 cm$^1$.

H$^+$ NMR: (CDCl3) δ ppm 9.06 (s, 1H), 7.62 (s, 1H), 7.49 (s, 1H), 7.13 (q, 1H), 5.79 (dd, 1H), 5.46 (d, 1H), 4.34 (t, 2H), 3.68 (s, 3H), 2.44 (t, 2H), 2.22 (t, 2H). F$^{19}$ NMR: (CDCl3) δ ppm −78.99 (s).

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed is:

1. A polymerizable polymer electrolyte material (PEM) formulation comprising:
   a polymerizable ionic liquid (IL) monomer containing a functional group capable of interacting lithium ions and a reactive polymerizable functional group capable of crosslinking;
   a lithium ion conducting salt;
   a plasticizer; and
   a cross-linker, wherein the lithium ion conducting salt is present in a range of from 10% to 50% by weight of the formulation.

2. The polymerizable formulation of claim 1, wherein the functional group capable of interacting with lithium ions includes a single bond carbon-oxygen-carbon structure.

3. The polymerizable formulation of claim 1, wherein the functional group capable of interacting with lithium ions is selected from ether, nitrile, silyl, fluoroalkyl, siloxane, sulfonate, carbonate, ester, ethylene oxide or combinations thereof.

4. The polymerizable formulation of claim 1, wherein the reactive polymerizable functional group capable of crosslinking contains a group selected from vinyl, allyl, acrylate, benzylvinyl and acryloyl.

5. The polymerizable formulation of claim 1, wherein the reactive polymerizable functional group capable of crosslinking contains at least one of a nitrogen cation moiety, a phosphorous cation moiety and a sulfur cation moiety.

6. The polymerizable formulation of claim 5, wherein the sulfur cation moiety is selected from the group consisting of sulfonium moieties.

7. The polymerizable formulation of claim 5, wherein the phosphorous cation moiety is selected from the group consisting of phosphonium moieties.

8. The polymerizable formulation of claim 1, wherein the cross-linker comprises at least one of mono-, di- and tri-acrylates and mono-, di- and tri-methacrylates.

9. A polymerizable polymer electrolyte material (PEM) formulation comprising:
   a polymerizable ionic liquid (IL) monomer containing a functional group capable of interacting lithium ions and a reactive polymerizable functional group capable of crosslinking containing a nitrogen cation moiety;
   a lithium ion conducting salt;
   a plasticizer; and
   a cross-linker, wherein the nitrogen cation moiety is selected from the group consisting of imidazolium, ammonium, pyridinium, piperidinium, pyrrolidinium, azepinium, and morpholinium moieties.

10. A polymerizable polymer electrolyte material (PEM) formulation comprising:
    a polymerizable ionic liquid (IL) monomer containing a functional group capable of interacting lithium ions and a reactive polymerizable functional group capable of crosslinking;
    a lithium ion conducting salt;
    a plasticizer; and
    a cross-linker, wherein the plasticizer is present in a range of from 5% to 50% by weight of the formulation.

11. The polymerizable formulation of claim 10, wherein the plasticizer is a room temperature ionic liquid (RTIL).

12. A polymerizable polymer electrolyte material (PEM) formulation comprising:
    a polymerizable ionic liquid (IL) monomer containing a functional group capable of interacting lithium ions and a reactive polymerizable functional group capable of crosslinking;
    a lithium ion conducting salt;
    a plasticizer; and
    a cross-linker, wherein the polymerizable ionic liquid (IL) monomer is present in a range of from 0.1% to 50% by weight of the formulation.

13. A polymerizable polymer electrolyte material (PEM) formulation comprising:
    a polymerizable ionic liquid (IL) monomer containing a functional group capable of interacting lithium ions and a reactive polymerizable functional group capable of crosslinking;
    a lithium ion conducting salt;
    a plasticizer; and
    a cross-linker, wherein the cross-linker is present in a range of 10% to 50% by weight of the formulation.

14. A polymerizable polymer electrolyte material (PEM) formulation comprising:
    a polymerizable ionic liquid (IL) monomer containing a functional group capable of interacting lithium ions and a reactive polymerizable functional group capable of crosslinking;
    a lithium ion conducting salt;
    a plasticizer;
    a cross-linker; and a polymerization initiator in a range of from 0.1% to 5% by weight of the formulation.

15. A solid polymer electrolyte comprising:
    a lithium ion conducting salt;
    a plasticizer;
    a cross-linker; and
    a cross-linked ionic liquid (IL) matrix comprising a polymer backbone having a functional group capable of interacting with lithium ions and having a plurality of pendant groups, wherein a plurality of cation moieties are attached to one or more of the plurality of pendant groups of the polymer backbone, the cationic moieties being at least one of a nitrogen cation moiety, a phosphorus cation moiety, and a sulfur cation moiety, wherein the lithium ion conducting salt is present in a range of from 10% to 50% by weight of the solid polymer electrolyte.

16. The electrolyte of claim 15, wherein the matrix includes a bifunctional ionic liquid crosslink.

17. An electrochemical cell comprising positive and negative electrodes spaced apart from each other in the electrolyte of claim 15.

18. A method of making a solid polymer electrolyte comprising:
  a. forming a reaction mixture comprising:
    i. a polymerizable ionic liquid (IL) monomer containing at least one functional group capable of interacting with lithium ions and a reactive polymerizable functional group capable of crosslinking the monomer, containing at least one of a nitrogen cation moiety, a phosphorous cation moiety, and a sulfur cation moiety,
    ii. a lithium ion conducting salt,
    iii. a plasticizer,
    iv. polymerization initiator and
    v. a cross-linker, wherein the lithium ion conducting salt is present in a range of from 10% to 50% by weight of the solid polymer electrolyte; and
  b. initiating polymerization in the reaction mixture to form a solid PEM, wherein the ionic liquid (IL) monomer forms a portion of a polymer core of the PEM.

19. The method of claim 18, wherein the polymerization reaction is initiated by a source of energy selected from a group consisting of ultraviolet light energy, heat, electron bombardment, and microwave energy.

* * * * *